United States Patent
Tsushima et al.

(10) Patent No.: US 8,406,686 B2
(45) Date of Patent: Mar. 26, 2013

(54) WIRELESS COMMUNICATION TERMINAL APPARATUS AND METHOD OF CONTROLLING SAME

(75) Inventors: Takaaki Tsushima, Saitama (JP); Hideaki Hatakeyama, Iwate (JP)

(73) Assignee: Sony Mobile Communications Japan, Inc., Tokyo (JP)

(*) Notice: Subject to any disclaimer, the term of this patent is extended or adjusted under 35 U.S.C. 154(b) by 895 days.

(21) Appl. No.: 11/748,116

(22) Filed: May 14, 2007

(65) Prior Publication Data
US 2007/0285255 A1 Dec. 13, 2007

(30) Foreign Application Priority Data
Jun. 8, 2006 (JP) ................. 2006-160165

(51) Int. Cl.
*H04B 5/00* (2006.01)
(52) U.S. Cl. ............... 455/41.1; 455/41.2; 340/572.7
(58) Field of Classification Search ............ 455/41.1, 455/41.2; 340/572.7
See application file for complete search history.

(56) References Cited

U.S. PATENT DOCUMENTS

| | | | |
|---|---|---|---|
| 5,568,512 A * | 10/1996 | Rotzoll | 375/221 |
| 5,953,642 A | 9/1999 | Feldtkeller et al. | |
| 6,837,438 B1 * | 1/2005 | Takasugi et al. | 235/492 |

FOREIGN PATENT DOCUMENTS

| | | |
|---|---|---|
| EP | 0 829 940 A2 | 3/1998 |
| EP | 1 014 301 A1 | 6/2000 |
| EP | 1 061 663 A1 | 12/2000 |
| JP | 07-321697 | 12/1995 |
| JP | 9-511886 | 11/1997 |
| JP | 2001-024413 | 1/2001 |
| JP | 2001-160124 | 6/2001 |
| JP | 2001-307039 | 11/2001 |
| JP | 2004-029873 | 1/2004 |
| JP | 2004-356765 | 12/2004 |
| JP | 2005-204038 | 7/2005 |
| JP | 2005-236585 | 9/2005 |
| JP | 2006-059099 | 3/2006 |
| WO | WO 00/27137 | 5/2000 |
| WO | WO 03/077364 A2 | 9/2003 |

* cited by examiner

*Primary Examiner* — Lana N Le
*Assistant Examiner* — Hsin-Chun Liao
(74) *Attorney, Agent, or Firm* — Oblon, Spivak, McClelland, Maier & Neustadt, L.L.P.

(57) ABSTRACT

A mobile communication terminal apparatus includes a non-contact communication section configured to perform non-contact communication with an external terminal apparatus. The non-contact communication section includes a main unit having a controller configured to control communication with the external terminal apparatus and a main antenna, and a sub-unit having a sub-antenna having a coil whose number of windings is smaller than the number of windings of a coil of the main antenna and an adjuster configured to adjust a resonance frequency.

3 Claims, 9 Drawing Sheets

WIRELESS COMMUNICATION TERMINAL APPARATUS AND METHOD OF CONTROLLING SAME

CROSS REFERENCES TO RELATED APPLICATIONS

The present invention contains subject matter related to Japanese Patent Application JP 2006-160165 filed in the Japanese Patent Office on Jun. 8, 2006, the entire contents of which are incorporated herein by reference.

BACKGROUND OF THE INVENTION

1. Field of the Invention

The present invention relates to a wireless communication terminal apparatus having a non-contact IC card function (RFID (Radio Frequency IDentification) function of an electromagnetic induction method) and to a method of adjusting the resonance frequency of an antenna for a non-contact IC card installed in the wireless communication terminal apparatus.

2. Description of the Related Art

In recent years, non-contact IC cards that can be used for various kinds of applications, such as for transportation commuter passes, logging of employees arriving/leaving the office, electronic money, and credit cards, have become popular. Furthermore, functions of such non-contact IC cards have now been incorporated in some mobile phones, and such mobile phones can be used to settle electronic money transactions.

In such a non-contact IC card, it is common practice that, when carrier waves are to be received from a reader-writer (hereinafter referred to as "R/W"), reception efficiency is improved by performing parallel resonance using self-inductance values (hereinafter abbreviated as "L values") possessed by a loop antenna and capacitors connected in parallel to the loop antenna. The parallel resonance frequency (hereinafter $F0$) is an optimum value in the vicinity of a carrier frequency (13.56 MHz), however, variations in $F0$ occur due to various factors.

First, variations in $F0$ may be caused by variations in the capacitances of capacitors that are connected in parallel. That is, since the relationship between the parallel resonance frequency and the capacitor capacitance is determined by $F0=\frac{1}{2}\pi\sqrt{(LC)}$, variations in capacitor capacitance are directly related to variations in $F0$.

Furthermore, variations in $F0$ may be caused by the positional relationship between an antenna and a peripheral metal. That is, in a mobile terminal in which a non-contact IC card is incorporated, in general, a metal is often used, such as for fill-patterns of a circuit substrate, a battery pack, a magnesium alloy for ensuring the strength of the housing, and a SUS (Steel Use Stainless) plate for a shield. This metal exists in an AC magnetic-field, and on the surface of the metal, eddy current occurs in a direction that cancels a change in the magnetic field. Then, magnetic-flux changes forming the self-inductance of the antenna are cancelled by the eddy current, and the L value of the antenna is decreased when a metal substance approaches the antenna. Therefore, variations in the positional relationship between the metal substance and the antenna are directly related to variations in $F0$.

Furthermore, variations in $F0$ may be caused by variations in the magnetic permeability of a magnetic substance (when a magnetic substance is used in the vicinity of the antenna). That is, canceling of changes in the magnetic flux due to eddy current causes carrier waves from the R/W to be attenuated and causes communication performance to be deteriorated. In order to reduce the attenuation and performance deterioration, in a mobile phone in which a non-contact IC card function is incorporated, a magnetic substance having a high magnetic permeability is often provided between an antenna and a metal. As a result, the magnetic flux that impinges on a metal is decreased, and the influence of the eddy current is reduced. On the other hand, the magnetic-flux density in the vicinity of the antenna is increased in proportion to the magnetic permeability. Then, when the magnetic-flux density forming the self-inductance is increased, the L value is increased. Therefore, variations in the magnetic permeability lead to variations in $F0$.

Also, variations in $F0$ occur due to the positional relationship between the antenna and the magnetic substance and due to the dimensional accuracy of the antenna. That is, the former case is related to the fact that, when the magnetic substance approaches the antenna, the L value is increased, and when the magnetic substance moves away from the antenna, the L value is decreased. In the latter case, variations in the L value due to variations in the pattern length and pattern intervals of a loop antenna are factors affecting $F0$.

When $F0$ becomes a value different from the carrier frequency due to the above-described variation factors, the communication distance becomes considerably decreased. Furthermore, since the difference between $F0$ and the carrier frequency appears as a phase difference between a transmission wave and a received wave of an R/W, an ASK modulation width disappears in the antenna of the R/W when a particular phase difference is reached, and a dead zone called a null occurs. In this state, since the card function side receives a carrier wave of a sufficient strength, power-on reset does not occur, and there is a case in which it is not possible to recover from an error state until a user removes the non-contact IC card so as to be outside the carrier frequency range.

In a mobile phone in which, in particular, a large amount of metal is used, since the amount of influence exerted by the metal of the mobile device on the R/W side needs to be taken into consideration, it is necessary to manage the $F0$ of the mobile phone at as narrow a band as possible. For this reason, adjustments for allowing the narrowing of $F0$ within a narrow band become necessary. In particular, in order to eliminate variation factors due to the positional relationship among the above-described variation factors, a mechanism capable of adjusting the resonance frequency after the housing of the mobile terminal is assembled in manufacturing steps becomes necessary.

Figure 1:
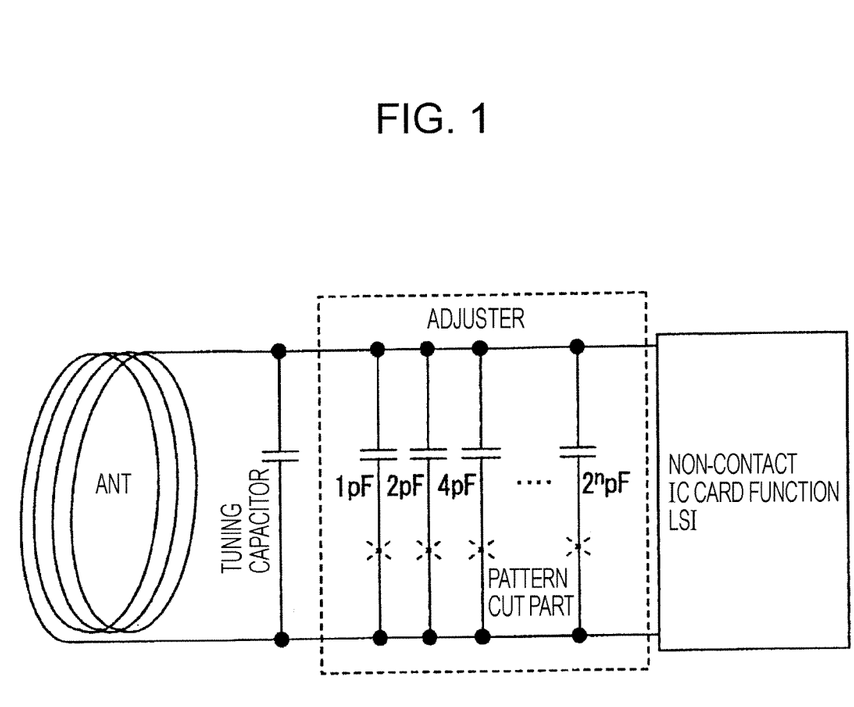
FIG. 1 shows an example of adjusting a resonance frequency using a pattern cut in the related art.

Examples of a method of adjusting a resonance frequency in the related art include a method using a cut pattern. This is a method in which, for example, as shown in FIG. 1, capacitors of 1 pF, 2 pF, 4 pF ... $2^n$ pF are arranged in parallel to each other, and a capacitance is selected in steps of 1 pF in the range of 0 pF to $(2^n-1)$ pF by cutting a pattern between capacitors and an antenna. However, in this method, a large number of operation steps or large facility costs are incurred. Furthermore, since it is difficult to restore the pattern to its original form after being cut, there is a drawback in that it is difficult to reuse a substrate when it fails in a manufacturing inspection of another item and maintenance is performed. Furthermore, since a hole through which cutting is performed after the non-contact IC card is set in the housing of the mobile terminal becomes necessary, there is a drawback in that this imposes limitations on mechanism design and mobile terminal design. In addition, another drawback is that it is difficult to place parts around the cut place, and in the case of a multilayered substrate, the internal layer pattern at the cut place may be damaged.

Figure 2:
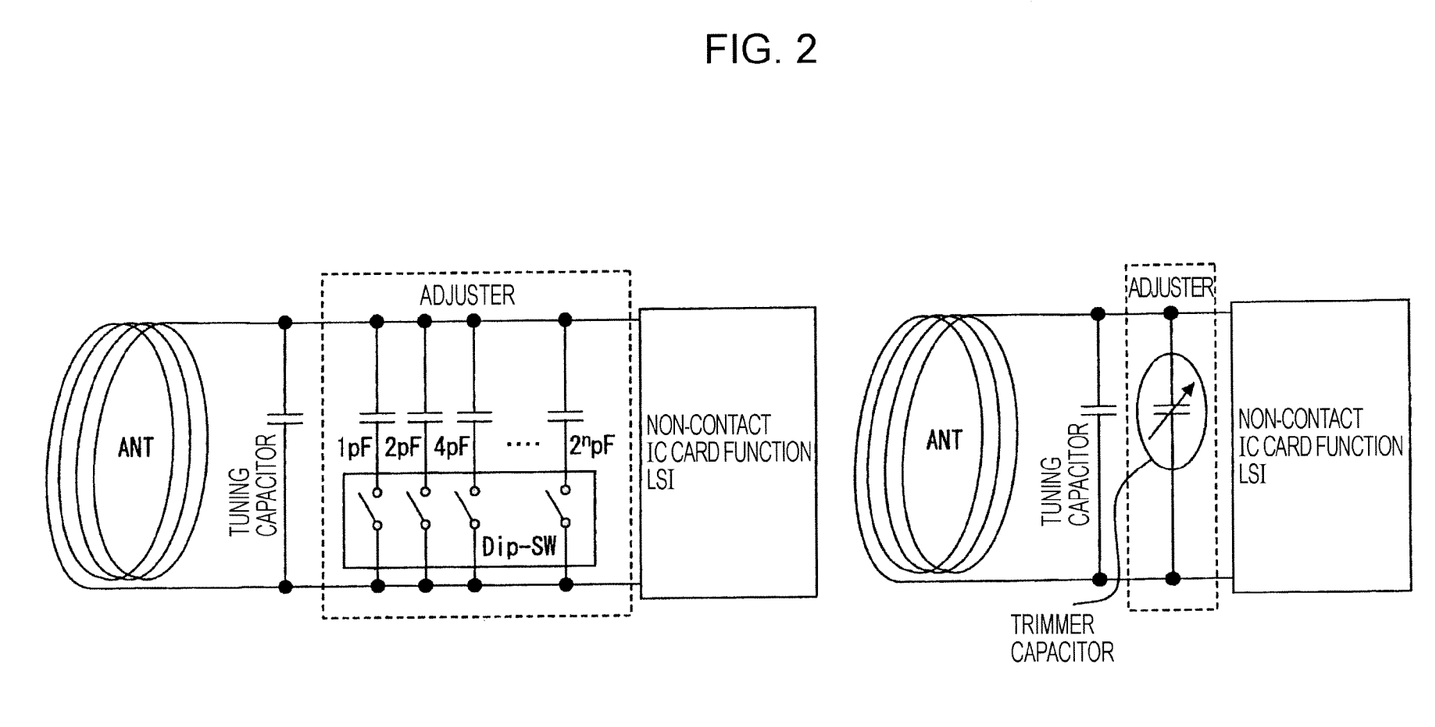
FIG. 2 shows an example of mechanically adjusting a resonance frequency in the related art.

Other examples of a method of adjusting a resonance frequency are mechanical adjustment methods. As shown in FIG. 2, such mechanical adjustment methods include a method of switching on or off parallel capacitors by using a dip-SW in place of a cut pattern and a method of performing F0 adjustments by turning a trimmer capacitor. These methods have a drawback in that a large number of operation steps are taken, and when the methods are performed after the housing is assembled, a hole for adjustment operation is necessary, thereby imposing limitations on mechanism design and mobile terminal design. Another drawback is that the dip-SW and the trimmer capacitor are typically of a size which allows operation by a person and which needs a large mounting area.

Figure 3:
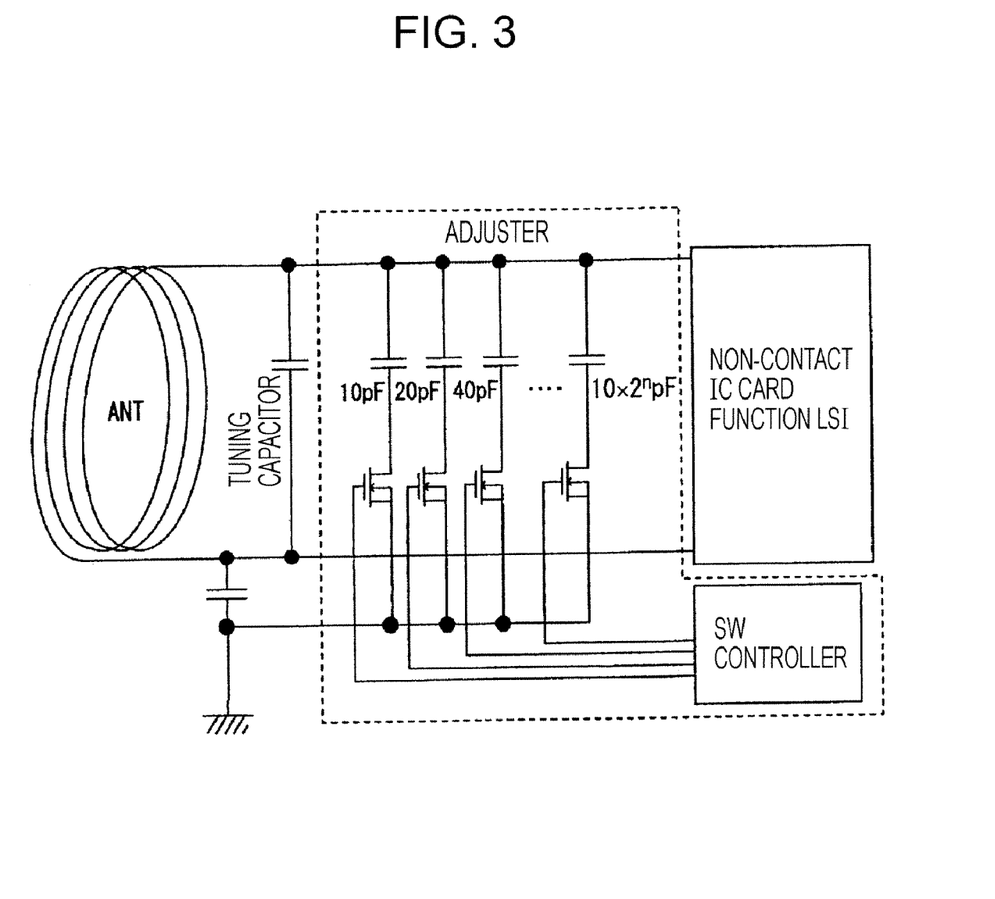
FIG. 3 shows an example of adjusting a resonance frequency using a switching element in the related art.

Accordingly, a method using a switching element has been considered. This is a method of using a switching element, such as an FET, instead of a dip-SW, as shown in FIG. 3 (refer to "University Lectures Up-To-Date Electrical Machinery & Apparatus", Revised and Enlarged Edition, October 1996, Author: Shota MIYAIRI, Publisher: Maruzen).

SUMMARY OF THE INVENTION

However, even this method does not provide a complete solution to the above problems. That is, in general, a high voltage (several tens of V) may be applied to a loop antenna for a non-contact IC card, and elements that can be used are limited. When such a high voltage is applied, a switching element, such as an FET, may be damaged, and the resonance frequency that has been adjusted with effort is varied again. Furthermore, since the parasitic capacitance of the switching element is a new variation factor, adjustment accuracy becomes poor. Since on-resistance leads to an occurrence of loss, it is preferable that an element having a low on-resistance be used. However, in general, in an element having a low on-resistance, since a large number of switches are connected in parallel to each other on the inside, parasitic capacitance is large. Furthermore, in a non-contact IC card function LSI of a method in which both ends of an antenna are balanced, the balance is broken unless a circuit is added for two terminals, and therefore, the number of parts is increased. Furthermore, if the non-contact IC card function LSI is used with the balance being broken, it becomes open to influence by extraneous noise. If a balance method is not used, the problems are solved, but the types of LSI that can be selected are limited. Furthermore, since it is difficult to perform control unless the electrical potential difference between a control terminal (e.g., the gate of an FET) of a switching element and a GND (e.g., the source of the FET) of the switching element is stabilized, a resonance loop is inevitably formed via the GND, as shown in FIG. 3 (when a mechanical relay is used, this does not apply, however, this is not practical in terms of power consumption and the size of parts). Since capacitors are provided between at least one of the terminals of the antenna and the GND thereof, when the non-contact IC card function LSI has an R/W function (carrier wave sending function), there is a problem in that power loss occurs when a carrier wave is transmitted.

The present invention has been made in view of such problems. It is desirable to provide a mobile communication terminal apparatus having a non-contact IC card function, which is configured so as to be capable of easily adjusting a resonance frequency F0 and capable of reducing the cost of facilities necessary for making adjustments, and a method of adjusting the resonance frequency F0.

According to an embodiment of the present invention, there is provided a mobile communication terminal apparatus including: a non-contact communication section configured to perform non-contact communication with an external terminal apparatus, wherein the non-contact communication section includes a main unit having a controller configured to control communication with the external terminal apparatus and a main antenna, and a sub-unit having a sub-antenna having a coil whose number of windings is smaller than the number of windings of a coil of the main antenna and an adjuster configured to adjust a resonance frequency.

The adjuster may include at least one adjustment capacitor, a switching element connected in series to each adjustment capacitor, and a switch controller configured to control on/off of the switching element, and the controller may control on/off of the switching element on the basis of an on/off pattern of the switching element, the on/off pattern being determined by the amount of deviation between a measured resonance frequency of the non-contact communication section and a target resonance frequency.

The coupling coefficient of the main antenna and the sub-antenna may be substantially 1. The ratio of the number of windings of the coil of the main antenna to that of the sub-antenna may be greater than or equal to 2 and smaller than or equal to 3.

According to another embodiment of the present invention, there is provided a method for adjusting a resonance frequency of a non-contact communication section configured to perform non-contact communication with an external terminal apparatus, the method including the steps of: measuring a resonance frequency of the non-contact communication section; computing the amount of deviation between the measured resonance frequency and a target resonance frequency; and adjusting the resonance frequency of the non-contact communication section on the basis of the amount of deviation.

In the adjustment, an on/off pattern of a switching element may be obtained from a table in which on/off patterns of the switching element are stored in such a manner as to correspond to the amount of deviation, the switching element may be set on/off, and the resonance frequency may be adjusted.

According to another embodiment of the present invention, there is provided a method for adjusting a resonance frequency of a non-contact communication section configured to perform non-contact communication with an external terminal apparatus, the method including the steps of: reading an on/off pattern of a switching element, the on/off pattern corresponding to the amount of deviation, from a table in which on/off patterns of the switching element are stored in such a manner as to correspond to the amount of deviation; and setting the switching element on or off on the basis of the read on/off pattern.

In the mobile communication terminal apparatus having a non-contact IC card function and the method of adjusting the resonance frequency according to an embodiment of the present invention, it is possible to easily adjust the resonance frequency F0 and to reduce the cost of facilities necessary for making adjustments.

DESCRIPTION OF THE PREFERRED EMBODIMENTS

Embodiments of the present invention will be described below with reference to the attached drawings.

<Configuration of Mobile Communication Terminal Apparatus>

Figure 4:
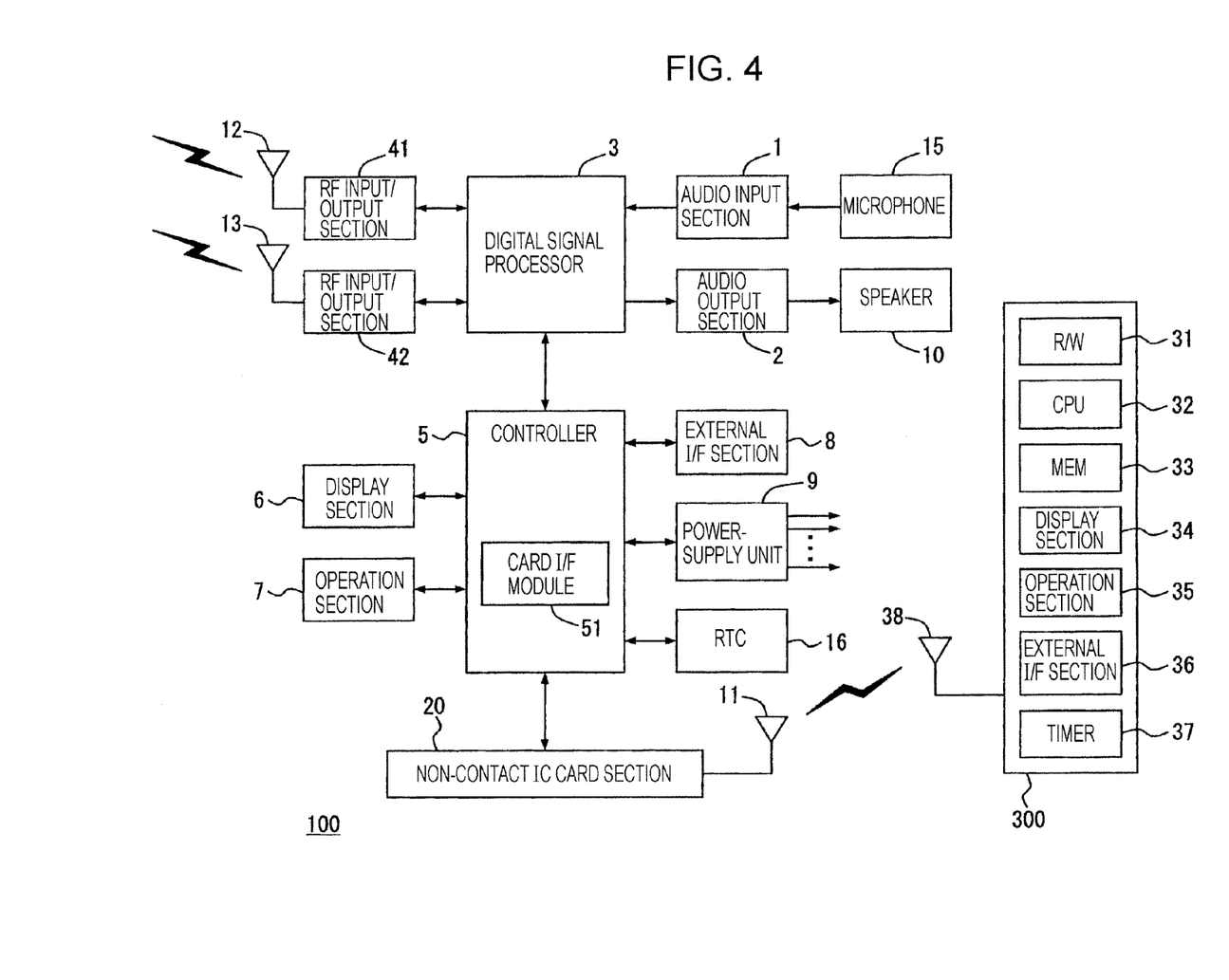
FIG. 4 is a block diagram showing the configuration of a mobile communication terminal 100 and an external terminal apparatus 300 according to an embodiment of the present invention.

FIG. 4 shows the block configuration of a mobile communication terminal 100 in which a non-contact IC card function is implemented according to an embodiment of the present invention. In FIG. 4, the mobile communication terminal is configured in such a manner that a controller (control means) 5 serves as a central unit, and a digital signal processor 3, a display section 6, an operation section 7, an external I/F section 8, a power-supply unit 9, an RTC (Real Time Clock) 16, and a non-contact IC card section 20 are connected to the controller 5. The controller 5 is a main unit for implementing the functions of the mobile communication terminal, and includes a CPU, an EEPROM, a flash ROM, a RAM, and the like although these are not shown. In this embodiment, the controller 5 further includes a card interface module 51 for transmitting and receiving commands and data to and from the non-contact IC card section 20.

The digital signal processor 3 is connected to an audio input section 1 to which a microphone 15 is connected, an audio output section 2 to which a speaker 10 is connected, an RF input/output section 41 to which an antenna 12 is connected, and an RF input/output section 42 to which an antenna 13 is connected. The digital signal processor 3 is a unit for encoding a digital audio signal, decoding into a digital audio signal, or the like, and includes dedicated circuits for convolution coding, slot interleave, delay detection, convolution decoding and the like with a DSP (Digital Signal Processor) functioning as a central unit. The mobile communication terminal according to this embodiment can be used in conjunction with at least a wireless communication system, and the antenna and the RF input/output section are usually incorporated for each wireless communication system. Therefore, in the example of FIG. 4, two systems are shown. The audio input section 1 is a part for converting an analog audio signal from the microphone 15 into a digital signal, and includes a microphone amplifier, a filter, an A/D converter, and the like. The audio output section 2 is a part for driving a received digital audio signal using a speaker, and includes a D/A converter, a filter, a speaker amplifier, and the like. The RF input/output section 4 is a part for transmitting and receiving high-frequency waves, and includes a quadrature modulator, a gain amplifier, a power amplifier, a diversity unit, a mixer, an IF demodulator, and the like.

The display section 6 is a part for displaying and outputting information to a user, and includes an LCD driver, an LCD display device, and the like. The operation section 7 is a part for the user to input operation information to the mobile communication terminal 100, and includes a keyboard, a jog dial, a joystick, and the like. The external I/F section 8 is a part for providing an interface with external devices, and includes a communication interface circuit, a 16-pin connector, and the like. The power-supply unit 9 is a part for supplying necessary electric power to each block on the basis of the battery power supply, and includes a power-supply circuit, a battery charging circuit, a protection circuit for over-current and over-voltage, and the like. The RTC 16 provides date and time information to the controller 5 on the basis of a clock signal.

The non-contact IC card section 20 (usually formed as an IC) is connected to a card interface module 51 of the controller 5, and internally includes, for example, a dedicated CPU, a flash ROM (MEM), which is a non-volatile memory for retaining data, programs, and the like, a wireless communication section, an interface section (not shown), and the like. The non-contact IC card section 20 exchanges data or the like with an external terminal apparatus 300 compatible with an IC card via the antenna 11 for wireless communication of the non-contact IC card function.

The card interface module 51 is incorporated as a part of the controller 5, and is a software module serving as both a user interface between the user and the non-contact IC card section 20 and a non-contact IC card interface.

A reader/writer (R/W) module 31 of the external terminal apparatus 300 is used to exchange commands and data with the non-contact IC card section 20. Examples of the external terminal apparatus 300 in this embodiment include a punching machine, a ticket checking machine, and an opening/closing gate of an autolock door, and includes a part (antenna) near which a non-contact IC card part is held. Furthermore, the external terminal apparatus 300 includes a reader/writer (R/W) module 31 and an antenna 38 and also includes, similarly to an ordinary computer, a CPU 32, memory (MEM) 33 such as a ROM and a RAM, a display section 34, an operation section 35, an external I/F section 36 for controlling communication with external apparatuses, a time measuring function (timer) 37, and the like. Usually, the external terminal apparatus 300 is connected to a service provider via the external I/F section 36.

In FIG. 4, a telephone set function is implemented in a section separately to the non-contact IC card section 20, and the IC card function is implemented in the non-contact IC card section 20. However, a signal line is connected from the non-contact IC card section 20 to the controller 5 of the mobile communication terminal, and this signal line is used to transmit information that a user has passed the ticket gate. An example in which the operation electrical power of the non-contact IC card section 20 according to this embodiment can be supplied from the power-supply unit 9 is shown. Alternatively, as in a single non-contact IC card, an electromotive force induced by radio waves from an external terminal may be used so as to allow operation of the non-contact IC card.

<Configuration and Operation Principles of Non-Contact IC Card Section for Adjusting Resonance Frequency>

Figure 5:
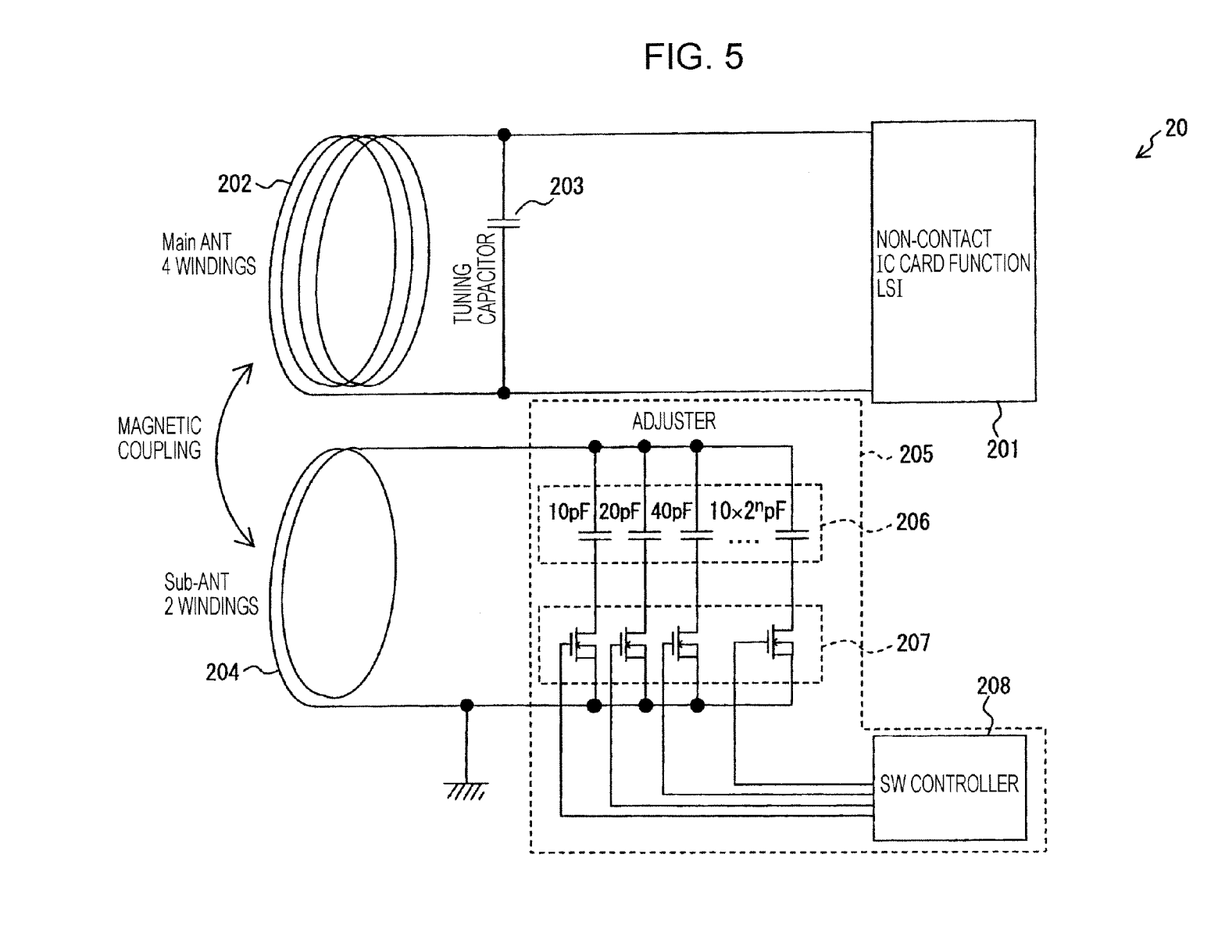
FIG. 5 shows a circuit configuration of a non-contact IC card section 20 for adjusting a resonance frequency according to an embodiment of the present invention.

FIG. 5 shows the circuit configuration of the non-contact IC card section 20 according to an embodiment of the present invention. As a result of adopting the configuration shown in FIG. 5, it is possible to easily adjust a resonance frequency at a low cost. The configuration of FIG. 5 is such that an adjuster of FIG. 3 is provided separately as a sub-antenna.

In FIG. 5, the non-contact IC card section 20 is constituted by a main antenna section and a sub-antenna section. The main antenna section includes a non-contact IC card function LSI 201, a main antenna coil 202, and a tuning capacitor 203. The coil 202 and the tuning capacitor 203 are used to increase the reception efficiency of the antenna by parallel resonance. The non-contact IC card function LSI 201 performs authentication when communication is performed with, for example, the external terminal apparatus 300, obtains predetermined information as a result of the communication with the external terminal apparatus 300 after authentication, and stores the information in a memory (not shown).

The sub-antenna section includes a sub-antenna coil 204 and an adjuster 205. The adjuster 205 includes a group of capacitors 206 for adjustments, in which adjustment capacitors having different capacities are connected in parallel to each other, a group of switching elements (FETs) 207, in which the switching elements are connected in series to the corresponding adjustment capacitors, are connected in parallel to each other, and an SW (switch) controller 208. The capacitances of the group of capacitors 206 are 10 pF, 20 pF, 40 pF . . . , and the capacitances of various adjustment capacitors can be realized by determining the on/off pattern of the group of switching elements 207. This is only an example, and if the capacitance is a value sufficiently large with respect to variations in the parasitic capacitance of the FET, the capacitance may be selected in accordance with the amount of shift in the resonance frequency, which is necessary for adjustments.

When the actual resonance frequency F0 deviates from the target value, the SW controller 208 determines the on/off pattern of the group of switching elements 207 in order to adjust the deviation. For example, the amounts of deviation and patterns are formed into a table, and a pattern is determined uniquely from the amount of deviation. In this embodiment, as the SW controller 208, for example, an n-ch FET is used. Alternatively, other elements may be used if the following conditions are satisfied: sufficiently high withstand voltage, low parasitic capacitance (or small variations in parasitic capacitance), and low on-resistance. Furthermore, in this example, the SW controller 208 is assumed to be an IO port of an MPU, but another device may be used if it can drive a control terminal of the switching element.

The numbers of windings of the main antenna coil 202 and the sub-antenna coil 204 are set so that the number of windings on the sub-antenna side is smaller than that on the main antenna, and the number of windings on the main antenna side is set to four and the number of windings on the sub-antenna side is set to two. However, this is only an example and, for example, the number of windings on the main antenna side may be set to three and the number of windings on the sub-antenna side may be set to one. If too large a number of windings is used, the capacitance of the adjustment capacitor needs to be large, and a problem may occur in terms of mounting space. Therefore, there is a limitation on the ratio of the number of windings of the sub-antenna to that of the main antenna in relation to the mounting space. Therefore, in this embodiment, it is preferable that, for example, the ratio of the number of windings of the main side to that of the sub-antenna side be greater than or equal to two and smaller than or equal to three.

When the number of windings on the sub-antenna side is made to be smaller than that on the main side in the manner described above, since the main side and the sub-antenna side are arranged in the form of a transformer (see FIG. 7), the exciting voltage on the sub-antenna side with a smaller number of windings is smaller, making it possible to use an FET having a low withstand voltage. As a result, the range of switching elements (FETs) that can be used is increased. That is, in the manner described above, as FETs that can be used, FETs having a low on-resistance and having as low a parasitic capacitance as possible are preferable. Since the voltage conditions on the sub-antenna side are moderated, it becomes easy to find an applicable FET.

Figure 6:
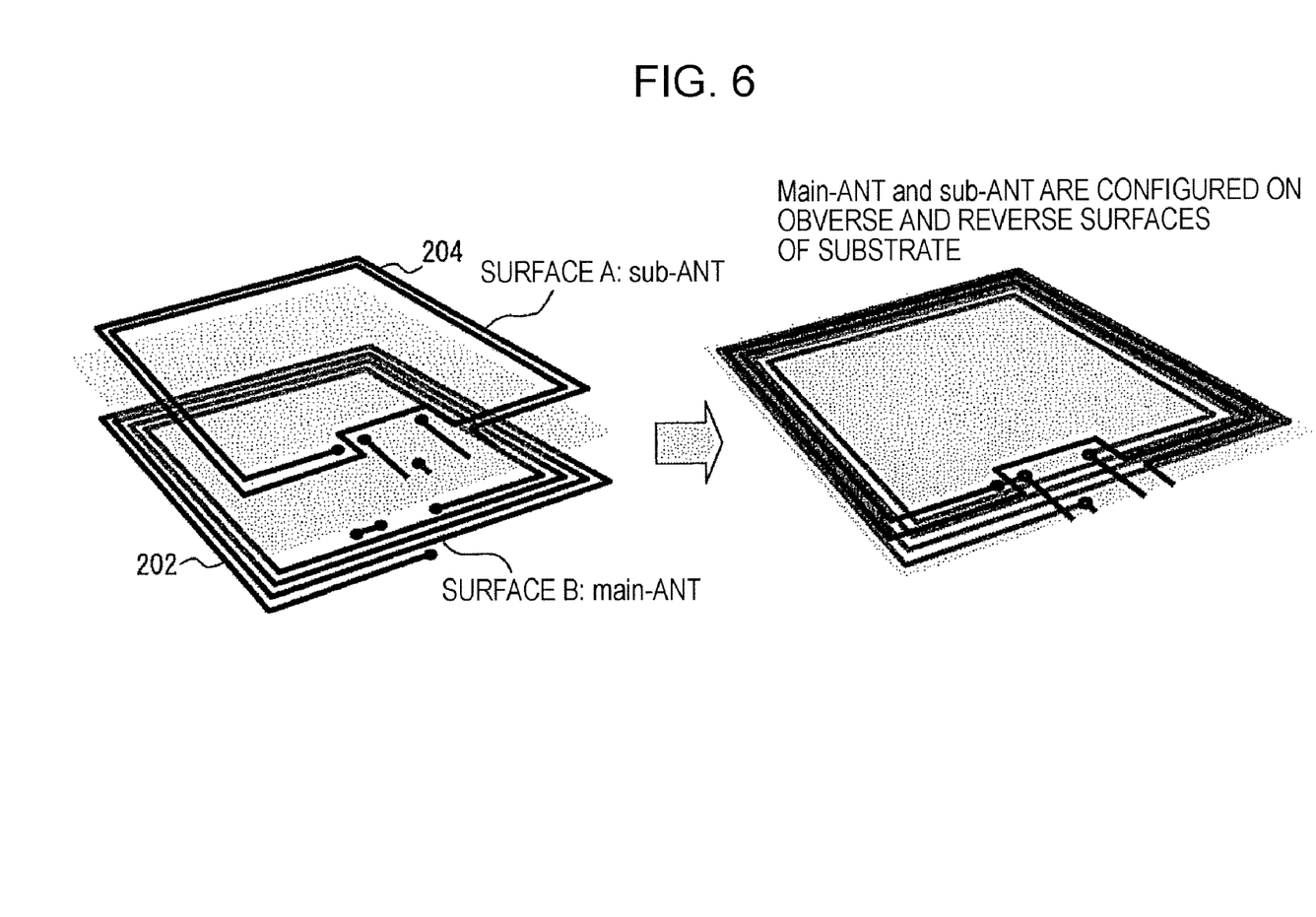
FIG. 6 shows the configuration of an antenna of the non-contact IC card section 20 according to an embodiment of the present invention.

Furthermore, it is preferable that the main antenna coil 202 and the sub-antenna coil 204 be densely magnetically coupled as much as possible so that the coupling coefficient approaches one. The reason for this is that, if the magnetic patterns drawn by the loops of the main antenna coil 202 and the sub-antenna coil 204 do not overlap each other, a leakage magnetic-flux is generated, and this leakage magnetic-flux may cause communication with the R/W 31 of the external terminal apparatus 300 to be disrupted. Therefore, in order to eliminate the leakage magnetic-flux as much as possible, as shown in FIG. 6, the horizontal and vertical dimensions of the main antenna coil 202 and the sub-antenna coil 204 are made the same, and wiring is performed using the obverse and reverse surfaces of the same substrate. As a result, positional variations are suppressed (as a result, the coupling coefficient can be made to approach one), and the main antenna coil 202 and the sub-antenna coil 204 can be arranged while hardly being influenced by the mounting space. Furthermore, in addition to an ordinary printed substrate or flexible substrate, the main antenna coil 202 and the sub-antenna coil 204 may be configured with an antenna using mutually twisted wire.

Figure 7:
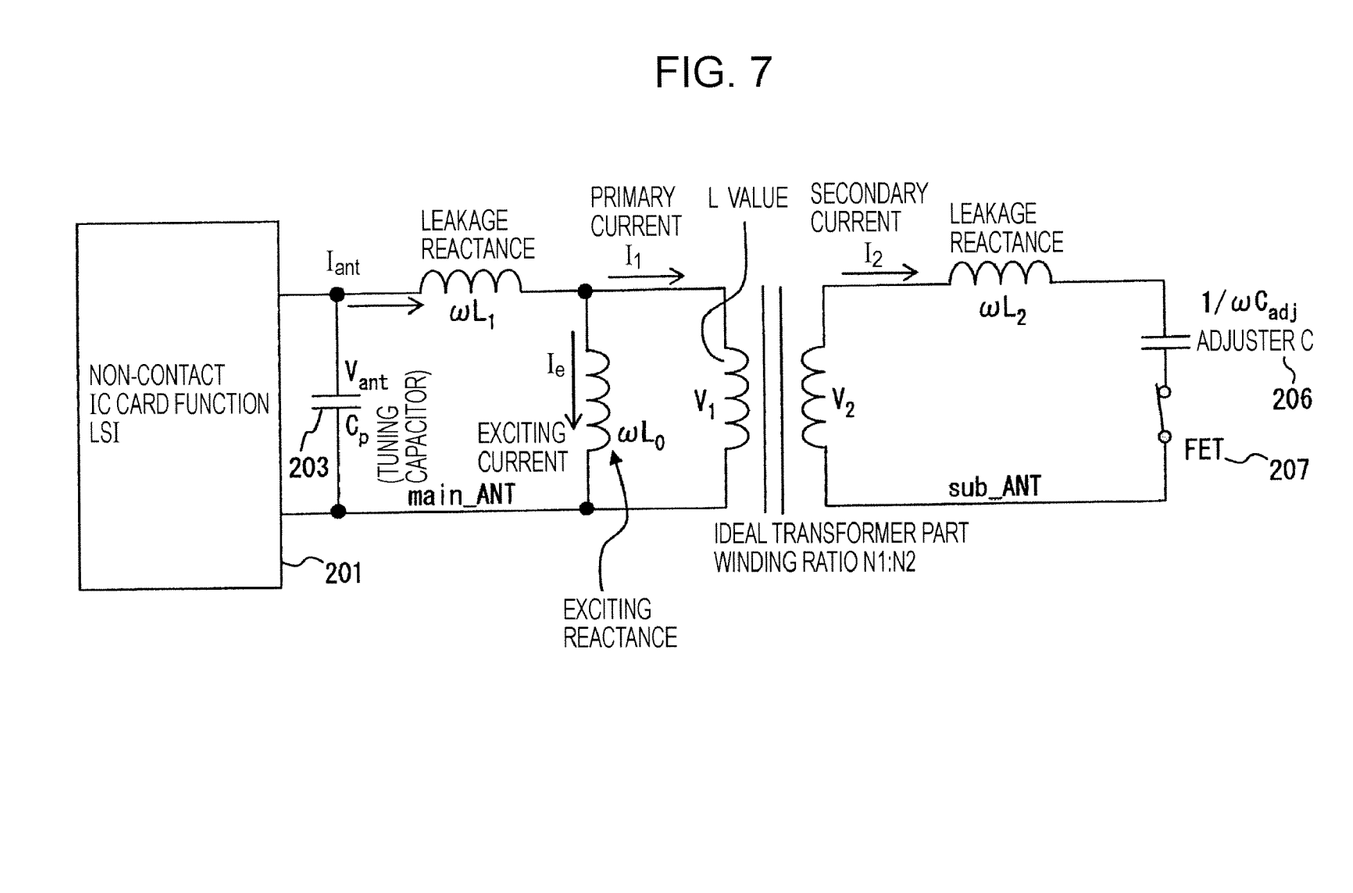
FIG. 7 shows the configuration of an equivalent circuit of the non-contact IC card section 20 shown in FIG. 5.

Next, a description will be given of the operation principles of a non-contact IC card having the above-described configuration. FIG. 7 shows an equivalent circuit of the circuit shown in FIG. 5, wherein the magnetically coupled part is assumed to be a transformer. However, in an actual antenna, since the coupling coefficient between the main antenna coil 202 and the sub-antenna coil 204 does not become 1, in the circuit of FIG. 7, leakage reactances $\omega L_1$ and $\omega L_2$ are taken into consideration ($\omega = 2\pi f$). Furthermore, in an actual antenna, since electrical current flows even if the secondary side has no load, an exciting reactance $\omega L_0$ is also taken into consideration.

Figure 8:
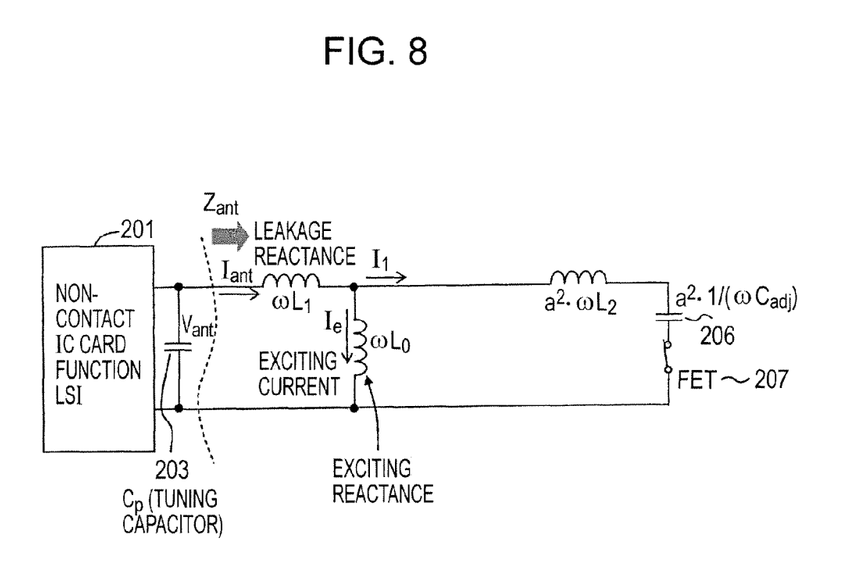
FIG. 8 shows impedance when viewed from a main antenna section side.

Here, if the ratio of the number of windings of the main antenna side to that of the sub-antenna side is denoted as $N_1:N_2$ and it is set that $a = N_1/N_2$ and an ideal transformer part is considered, $I_1:I_2 = N_2:N_1$, $V_1:V_2 = N_1:N_2$, and $V_1/I_1 = (N_1/N_2)^2 \cdot V_2/I_2$. Therefore, since the impedance on the sub-antenna side when viewed from the main antenna side appears as a value multiplied by $a^2$, conversion can be performed as shown in FIG. 8. Here, the impedance $Z_{ant}$ of the antenna when viewed from the terminal part of the LSI 201 can be expressed as shown below:

$$I_{ant} = I_1 + I_e$$

$$V_{ant} = \omega L_1 \cdot (I_1 + I_e) + I_1 \cdot a^2 \cdot \omega L_2 + I_1 \cdot a^2 \cdot 1/\omega C_{adj}$$

$$Z_{ant} = V_{ant}/I_{ant}$$

$$= \omega L_1 + I_1 \cdot a^2/(I_1 + I_e) \cdot \omega L_2 + I_1 \cdot a^2/(I_1 + I_e) \cdot 1/\omega C_{adj}$$

It can be revealed from the above equations that, by reducing the exciting current $I_e$ and the leakage reactances $\omega L_1$ and $\omega L_2$ as much as possible, $1/\omega C_{adj}$ becomes dominant and that, by increasing $I_1 \cdot a^2/(I_1 + I_e)$ to more than 1, $1/\omega C^{adj}$ becomes large. That is, it can be revealed that $C_{adj}$ is small.

When the resonance frequency is kept constant, use of the above properties makes it possible to install an adjustment capacitor having a large capacitance on the sub-antenna side while taking a large L value (see FIG. 7) on the main antenna side. By using a capacitance sufficiently larger than the parasitic capacitance of the switching element (FET) in the adjustment capacitor, it becomes possible to relatively reduce the influence of the parasitic capacitance of the FET. Furthermore, when the winding ratio a is larger than 1 and the leakage reactance is small, the exciting voltage of the sub-antenna is lower than that of the main antenna in proportion to the winding ratio. Therefore, by using this property, the problem of the withstand voltage of the switching element can also be compensated for.

<Configuration of Automatic Adjustment System>

Figure 9:
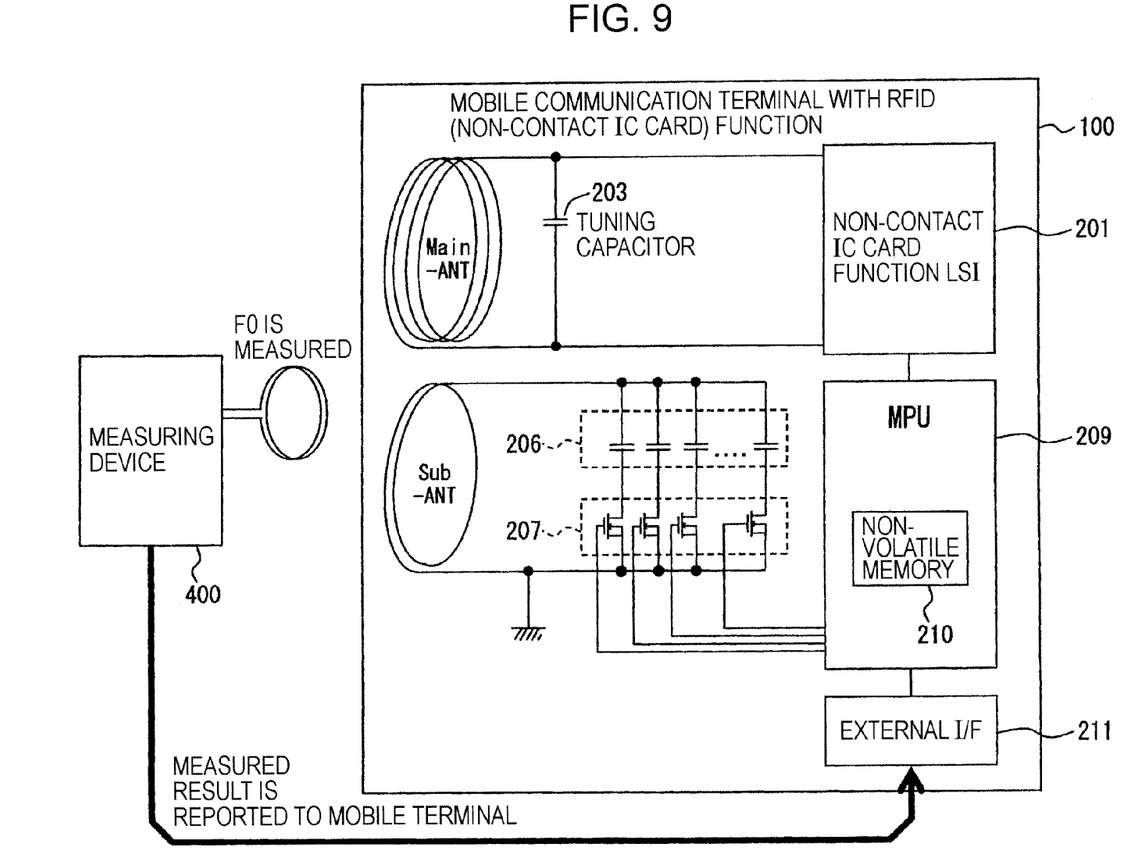
FIG. 9 shows the configuration of an automatic adjustment system according to an embodiment of the present invention.

Next, a description will be given, with reference to FIG. 9, of an automatic adjustment system of a resonance frequency in the mobile communication terminal 100. FIG. 9 shows the configuration of an automatic adjustment system of a resonance frequency, and also shows an example in which the above-described principles are applied to the automatic adjustment system.

In the process of manufacturing and inspecting the mobile communication terminal 100, a measuring device 400 for measuring a resonance frequency F0, such as a network analyzer, is prepared, so that measured results are fed back to an MPU 209 of the mobile communication terminal 100 via an external I/F 211 of the mobile communication terminal 100. The MPU 209 computes the amount of deviation between the measured resonance frequency F0 and the target value. A non-volatile memory 210 has stored therein on/off patterns of the FET, which correspond to amounts of deviations, reads a pattern corresponding to the amount of the computed deviation, and performs on/off control of the FET. That is, when the measured resonance frequency F0 is higher than the target resonance frequency, a set value (on/off pattern) at which the resonance frequency F0 is decreased is used, and when the measured resonance frequency F0 is lower than the target resonance frequency, a set value at which the resonance frequency F0 is increased is used. When the measured resonance frequency F0 falls within a particular acceptance range, the process is normally completed. The set value when the process is normally completed is written into a non-volatile memory. Hereafter, when the mobile communication terminal 100 is to be started up, the FET is turned on/off in accordance with the value of the non-volatile memory, and the resonance frequency is set.

As described in the foregoing, according to this embodiment, since electrical adjustments can be performed, a mobile communication terminal can be constituted by parts having a very small size when compared with parts, such as a dip-SW, which need to be manually operated by a human, thereby making it possible to contribute to a reduced size of the mobile communication terminal 100.

According to this embodiment, since control is performed using an electrical signal, the adjustment of the resonance frequency can be easily automated. Furthermore, after the housing of the mobile communication terminal 100 is assembled, the resonance frequency can be adjusted, and there is no need to open a hole in the housing. This brings about merits that the degree of freedom of mechanism design and mobile terminal design is increased.

According to this embodiment, by decreasing the ratio of the number of windings of the sub-antenna coil, it is possible to relatively decrease the influence of the parasitic capacitance of an FET, and the accuracy of adjusting the resonance frequency is improved. As a result of decreasing the ratio of the number of windings of the sub-antenna, it is possible to select a switching element having a low withstand voltage. As a result, other parameters, such as on-resistance, leakage current, and cost effectiveness, can be made to take priority, and choices are widened.

According to this embodiment, since a sub-antenna is used, it becomes easy to add an adjustment circuit to a non-contact IC card function LSI of a balance method without losing the balance. Furthermore, since the adjustment circuit is electrically separated from the main antenna, influences on the non-contact IC card function LSI and peripheral circuits thereof are substantially only from magnetic coupling, and it is easy to introduce an adjustment system without impeding the original non-contact IC card communication function.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile communication terminal apparatus comprising:
    a non-contact communication section configured to perform non-contact communication with an external terminal apparatus, wherein the non-contact communication section includes:
        a main unit having a controller configured to control communication with the external terminal apparatus;
        a main antenna coil disposed on an obverse surface of a substrate;
        a sub-antenna coil disposed on a reverse surface of the substrate and having a same horizontal and vertical dimension as the main antenna coil and covering a same surface area as the main antenna coil, having a number of windings less than a number of windings of a coil of the main antenna coil, and coupling densely magnetically with the main antenna coil such that a coupling coefficient value is substantially one to reduce leakage of magnetic flux from the non-contact communication section; and
        an adjuster configured to adjust a resonance frequency.

2. The mobile communication terminal apparatus according to claim 1, wherein the adjuster comprises at least one adjustment capacitor, a switching element connected in series to each adjustment capacitor, and a switch controller configured to control on/off of the switching element, and
    the controller controls on/off of the switching element on the basis of an on/off pattern of the switching element, the on/off pattern being determined by the amount of deviation between a measured resonance frequency of the non-contact communication section and a target resonance frequency.

3. The wireless communication terminal apparatus according claim 1, wherein the ratio of the number of windings of the coil of the main antenna coil to that of the sub-antenna coil is greater than or equal to 2 and smaller than or equal to 3.

* * * * *